United States Patent
Chisholm et al.

(10) Patent No.: US 9,765,186 B2
(45) Date of Patent: Sep. 19, 2017

(54) POLYAMIDE COPOLYMERS HAVING 2,5-FURAN DICARBOXAMIDE UNITS

(71) Applicants: Bret Ja Chisholm, West Fargo, ND (US); Satyabrata Samanta, Fargo, ND (US)

(72) Inventors: Bret Ja Chisholm, West Fargo, ND (US); Satyabrata Samanta, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 0 days.

(21) Appl. No.: 14/900,402

(22) PCT Filed: Jun. 20, 2014

(86) PCT No.: PCT/US2014/043428
§ 371 (c)(1),
(2) Date: Dec. 21, 2015

(87) PCT Pub. No.: WO2014/205358
PCT Pub. Date: Dec. 24, 2014

(65) Prior Publication Data
US 2016/0145388 A1    May 26, 2016

Related U.S. Application Data

(60) Provisional application No. 61/838,017, filed on Jun. 21, 2013.

(51) Int. Cl.
| | | |
|---|---|---|
| *C08G 69/26* | (2006.01) | |
| *C08G 63/181* | (2006.01) | |
| *C08G 69/28* | (2006.01) | |
| *C08L 77/06* | (2006.01) | |
| *B29C 43/00* | (2006.01) | |
| *B29C 45/00* | (2006.01) | |
| *B29K 77/00* | (2006.01) | |

(52) U.S. Cl.
CPC .......... *C08G 69/265* (2013.01); *B29C 43/003* (2013.01); *B29C 45/0001* (2013.01); *C08G 63/181* (2013.01); *C08G 69/26* (2013.01); *C08G 69/28* (2013.01); *C08L 77/06* (2013.01); *B29K 2077/00* (2013.01)

(58) Field of Classification Search
CPC .... C08G 69/265; C08G 63/181; C08G 69/26; C08G 63/183; C08L 77/06
See application file for complete search history.

(56) References Cited

U.S. PATENT DOCUMENTS

| | | | | |
|---|---|---|---|---|
| 5,420,231 A * | 5/1995 | Delius | ................ | C08G 69/265 |
| | | | | 528/341 |
| 9,109,092 B2 * | 8/2015 | Kim | ................ | C08G 81/00 |
| 2013/0011631 A1 | 1/2013 | Sakellarides et al. | | |
| 2013/0328244 A1 * | 12/2013 | Chisholm | ............. | C08G 69/00 |
| | | | | 264/328.1 |
| 2016/0237211 A1 * | 8/2016 | Duursma | .............. | C08G 69/26 |

FOREIGN PATENT DOCUMENTS

| | | | |
|---|---|---|---|
| CN | 102311546 A | | 1/2012 |
| JP | 2009-001630 | * | 1/2009 |
| WO | WO 2012/082679 A1 | | 6/2012 |

OTHER PUBLICATIONS

Grosshardt et al "Synthese und Charakterisierung von Polyestern und Polyamiden auf der Basis von Furan-2,5-dicarbonsäure", Chemie Ingenieur Technik 2009, 81, No. 11, Nov. 2009.*
Allegra et al., "Isomorphism in Synthetic Macromolecular Systems," *Adv Polym Sci*, 1969;6/4:549-574.
ASTM D256 "Standard Test Methods for Determining the Izod Pendulum Impact Resistance of Plastics," ASTM International, West Conshohocken, PA, 2010.
Flory, Paul J., "Theory of the Melting Point Depression," in *Principles of Polymer Chemistry*, $1^{st}$ Edition; Chapter XIII; Section 2b. Cornell University Press: Ithaca, NY, State; 1983. Cover page, publisher's page, and pp. 568-576.
Helfand et al., "Theory of Copolymer Crystallization," *Macromolecules*, 1973;6(4):631-638.
International Search Report and Written Opinion for PCT/US2014/043428, issued by the U.S. Patent and Trademark Office on Oct. 10, 2014; 8 pgs.
International Preliminary Report on Patentability for PCT/US2014/043428, issued by the International Bureau of WIPO, on Dec. 30, 2015; 8 pgs.
Isasi et al., "Some aspects of the crystallization of ethylene copolymers," *Polymer*, 2000;41:8813-8823.
Khanna, "A barometer of crystallization rates of polymeric materials," *Polym Eng Sci*, Dec. 1990;30(24):1615-1619.
Kugel et al., "Semicrystalline Polyaminde Engineering Thermoplastics Based on the Renewable Monomer, 1,9-Nonane Diamine: Thermal Properties and Water Absorption," *Poly-Pastics Tech Eng*, 2012; 51(12):1266-1574.
Natta et al., "Isomorphism phenomena in macromolecules," *J Polym Sci*, Jun. 1961;51(156):527-539.

* cited by examiner

*Primary Examiner* — Gregory Listvoyb
(74) *Attorney, Agent, or Firm* — Mueting Raasch & Gebhardt, P.A.

(57) ABSTRACT

Polyamide copolymers, and methods of making and using polyamide copolymers, having 2,5-furan dicarboxamide units are disclosed herein. Such polymers can be useful for engineering thermoplastics having advantageous physical and/or chemical properties.

14 Claims, No Drawings

POLYAMIDE COPOLYMERS HAVING 2,5-FURAN DICARBOXAMIDE UNITS

This application is the §371 U.S. National Stage of International Application No. PCT/US2014/043428, filed 20 Jun. 2014, which claims the benefit of U.S. Provisional Application No. 61/838,017, filed Jun. 21, 2013, each of which are incorporated herein by reference in their entireties.

GOVERNMENT FUNDING

This invention was made with government support under Grant No. DE-FG36-08GO88160 awarded by the Department of Energy. The government has certain rights in the invention.

BACKGROUND

Organic chemicals are typically derived from building blocks that are obtained from natural gas, petroleum, and coal. Approximately 13 percent of the crude oil used in the United States currently goes into the production of nonfuel chemicals. Because fossil resources are limited, there is a need to develop useful chemicals from renewable resources. Renewable resources that have been used to produce chemicals include plant oils, polysaccharides, sugars, and wood.

Engineering thermoplastics (such as Nylon 6,6) are widely used to prepare parts that may require the mechanical strength and physical and chemical stability that may be provided by the thermoplastic material. Engineering thermoplastics are commonly fabricated into the desired parts using melt processing methods such as injection molding. Oxidation of unsaturated fatty acids can be used to produce long-chain aliphatic dicarboxylic acids and diamines useful for the production of polyamides. Polyamides produced from plant oil-derived fatty acids have found utility in applications such as adhesives, inks, and coatings.

However, there is a continuing, unmet need for engineering thermoplastics that can be processed faster and/or under milder conditions in melt processing methods such as injection molding, and particularly for such engineering thermoplastics that are produced at least partially from renewable resources.

SUMMARY

In one aspect, the present disclosure provides polyamide copolymers, and methods of making and using polyamide copolymers. In some embodiments, the polyamide copolymers have the following structural units:

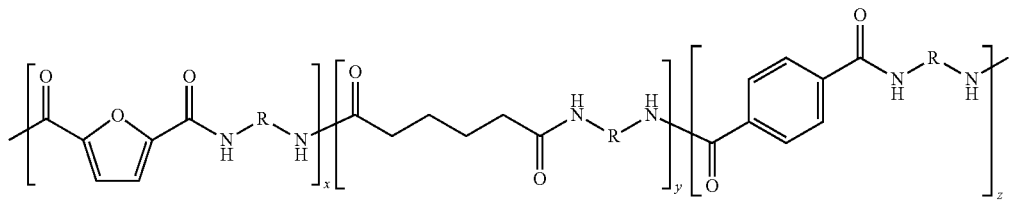

where R is a C1-C30 alkylene unit. Also, x cannot be 0, but y or z can be 0. Further, y and z cannot both be zero.

In one embodiment, the polyamide copolymer includes at least one alkylene 2,5-furan dicarboxamide unit, with the proviso that the copolymer does not include —$(CH_2)_{10}$— alkylene units. In certain embodiments, the at least one alkylene 2,5-furan dicarboxamide unit is of the formula:

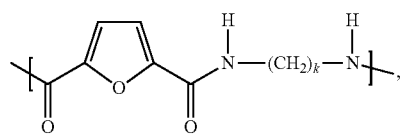

wherein k=6-9 or 11-30. In some embodiments, the copolymer can further include at least one alkylene terephthalamide unit and/or at least one alkylene adipamide unit.

In another embodiment, the polyamide copolymer includes at least one alkylene 2,5-furan dicarboxamide unit and at least one alkylene adipamide unit. In certain embodiments, the at least one alkylene 2,5-furan dicarboxamide unit is of the formula:

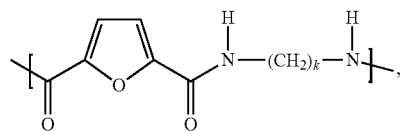

wherein k=6-30. In certain embodiments, the at least one alkylene adipamide unit is of the formula:

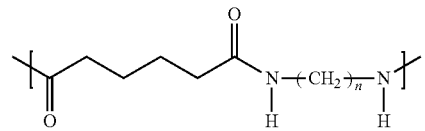

wherein n=6 to 30. Optionally, the copolymer can further include at least one alkylene terephthalamide unit. In certain embodiments, the at least one alkylene terephthalamide unit is of the formula:

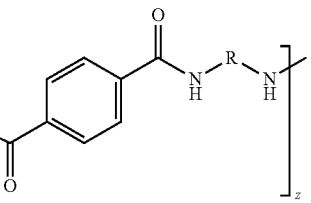

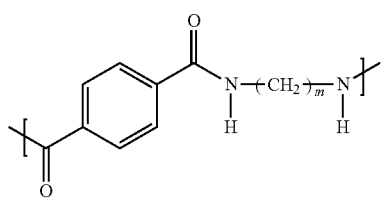

wherein m=6 to 30.

In some embodiments, polyamide copolymers as disclosed herein can have a difference between melting temperature ($T_m$) and crystallization temperature ($T_c$) of at most 50° C., in certain embodiments at most 40° C., and in some certain embodiments at most 30° C.; wherein the crystallization temperature ($T_c$) is taken as the maximum of the crystallization exotherm of a differential scanning calorimetry (DSC) thermogram obtained by cooling the polyamide copolymer from 300° C. to 25° C. at 20° C. per minute; and wherein the melting temperature ($T_m$) is taken as the maximum of the melting endotherm of a differential scanning calorimetry (DSC) thermogram obtained by subsequently heating the polyamide copolymer from 25° C. to the molten state at 20° C. per minute.

In another aspect, the present disclosure provides a method of fabricating an article that includes: providing a polyamide copolymer as disclosed herein; and melt processing the polyamide copolymer under conditions effective to form the article. In certain embodiments, conditions effective can include one or more of injection molding, compression molding, transfer molding, and extrusion.

In another aspect, the present disclosure provides a method of preparing a polyamide copolymer. In one embodiment, the method includes providing a copolyamide prepolymer including alkylene 2,5-furan dicarboxamide repeat units, with the proviso that the copolyamide prepolymer does not include —$(CH_2)_{10}$— alkylene units; and heating the copolyamide prepolymer under conditions effective to form the polyamide copolymer. In certain embodiments, the copolyamide prepolymer can further include alkylene terephthalamide repeat units and/or alkylene adipamide repeat units.

In another embodiment, the method of preparing the polyamide copolymer includes: providing a copolyamide prepolymer including alkylene 2,5-furan dicarboxamide repeat units and alkylene adipamide repeat units; and heating the copolyamide prepolymer under conditions effective to form the polyamide copolymer. Optionally, the copolyamide prepolymer can further include alkylene terephthalamide repeat units.

Polyamides represent a huge market with nylon 6,6 and nylon 6 having by far the largest volume. There is a big need for relatively high melting polyamides and polyamides that possess low moisture uptake. The polyamide copolymers disclosed herein can have both high melting temperatures and low water uptake. In addition, they can crystallize relatively fast and have good thermal stability, which can enable processing by injection molding. The polyamide copolymers disclosed herein have also been shown to be significantly better than Nylon 6,6 especially with respect to moisture absorption, which is a primary drawback for nylon 6,6 and nylon 6 for many applications.

The polyamide copolymers disclosed herein that include 2,5-furan dicarboxamide units can be advantageous over commodity polyamides such as Nylon 6 and Nylon 6,6. For example, the 2,5-furan dicarboxamide units can be prepared from 2,5-furan dicarboxylic acid, a diacid that can be produced from renewable resources. Further, adipic acid, hexamethylene diamine, and nonane diamine can all be obtained from renewable resources. For example, adipic acid can be used as a starting material to produce hexamethylene diamine, and nonane diamine can be produced from azelaic acid, which is derived from oleic acid and which is obtained from many plant oils. It is also possible to produce terephthalic acid from renewable resources.

DEFINITIONS

The term "comprises" and variations thereof do not have a limiting meaning where these terms appear in the description and claims.

As used herein, "a," "an," "the," "at least one," and "one or more" are used interchangeably.

As used herein, the term "or" is generally employed in the sense as including "and/or" unless the context of the usage clearly indicates otherwise.

Also herein, the recitations of numerical ranges by endpoints include all numbers subsumed within that range (e.g., 1 to 5 includes 1, 1.5, 2, 2.75, 3, 3.80, 4, 5, etc.).

The above summary is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Most prior work involving 2,5-furan dicarboxamide (FDCA)-based polyamides has focused on production of amorphous polymers and/or homopolymers. We found that polyamide homopolymers based on FDCA did not crystallize very well, and thus, were of limited utility. However, we found that FDCA copolymers that include alkylene terephthalamide and/or alkylene adipamide units exhibited fast crystallization and, in many cases, very desirable properties.

For semi-crystalline polymers, copolymerization typically results in a reduction in melting point and crystallization rate due to the inability of the two polymer repeat units to pack into the same crystal lattice. See, for example, Flory, *Principles of Polymer Chemistry*, 1st Edition, 1953, 568-576; Isasi et al., 2000, *Polymer*, 41:8813-8823; and Allegra et al., *Adv. Polym. Sci.*, 1969, 6:549. In rare cases, cocrystallization (e.g., isomorphism) of repeat units has been observed. See, for example, Helfand et al., *Macromolecules*, 1973, 6:631-638; and Natta et al., *J. Polym. Sci.*, 1962, 51:527-539.

In general, for a polymer to readily crystallize, the chemical composition of the polymer backbone should be uniform. Thus, most commercially relevant semi-crystalline polymers are homopolymers as opposed to copolymers. Typically, if a second repeat unit is incorporated into the backbone of a crystallizable homopolymer, the melting point will be reduced and crystallization rate will be decreased because the repeat units derived from the comonomer do not fit into the crystal unit cell with the parent polymer repeat units. Essentially the repeat units derived from the comonomer create defects in the polymer chain that inhibit the process of crystallization. This behavior is similar to eutectic behavior observed for mixtures of crystallizable small molecules. In rare cases, the two different repeat units of a copolymer will pack into the same crystalline unit cell and crystallizability will be maintained over a wide range of copolymer compositions. When two repeat units can cocrystallize into the same crystal unit cell, the repeat units are said to be isomorphous.

Homopolymers based on 2,5-furan dicarboxylic acid (FDCA) were initially prepared using two different diamines, and it was found that the homopolymers did not crystallize very well. The poor crystallizability of these homopolymers largely limits the utility of these polymers, especially for applications that utilize injection molding to produce objects. However, the FDCA copolymers disclosed herein that include alkylene terephthalamide and/or alkylene adipamide units exhibited enhanced crystallizability, and the melting temperature can be tailored. The results disclosed herein clearly demonstrate that copolymerization can provide polymers that readily crystallize and possess very desirable properties.

In one embodiment, the polyamide copolymer includes at least one alkylene 2,5-furan dicarboxamide unit, with the proviso that the copolymer does not include —(CH$_2$)$_{10}$— alkylene units. In certain embodiments, the at least one alkylene 2,5-furan dicarboxamide unit is of the formula:

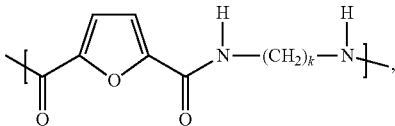

wherein k=6-9 or 11-30. In some embodiments, the copolymer can further include at least one alkylene terephthalamide unit and/or at least one alkylene adipamide unit. A wide variety of alkylene diamines can be used to independently prepare each of the amide units. Exemplary alkylene diamines include, but are not limited to, hexamethylene diamine and 1,9-nonanediamine. In preferred embodiments, all the amide units in the copolymer include the same diamine fragment.

In another embodiment, the polyamide copolymer includes at least one alkylene 2,5-furan dicarboxamide unit and at least one alkylene adipamide unit. In certain embodiments, the at least one alkylene 2,5-furan dicarboxamide unit is of the formula:

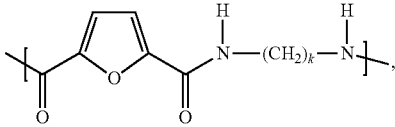

wherein k=6-30. In certain embodiments, the at least one alkylene adipamide unit is of the formula:

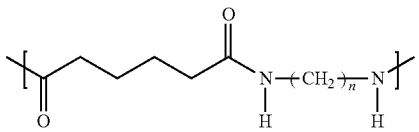

wherein n=6 to 30. Optionally, the copolymer can further include at least one alkylene terephthalamide unit. In certain embodiments, the at least one alkylene terephthalamide unit is of the formula:

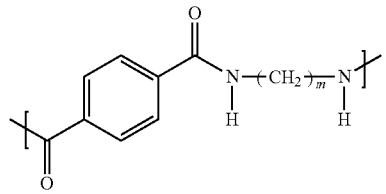

wherein m=6 to 30. A wide variety of alkylene diamines can be used to independently prepare each of the amide units. Exemplary alkylene diamines include, but are not limited to, hexamethylene diamine and 1,9-nonanediamine.

In some embodiments, polyamide copolymers as disclosed herein can have a difference between melting temperature ($T_m$) and crystallization temperature ($T_c$) of at most 50° C., in certain embodiments at most 40° C., and in some certain embodiments at most 30° C.; wherein the crystallization temperature ($T_c$) is taken as the maximum of the crystallization exotherm of a differential scanning calorimetry (DSC) thermogram obtained by cooling the polyamide copolymer from 300° C. to 25° C. at 20° C. per minute; and wherein the melting temperature ($T_m$) is taken as the maximum of the melting endotherm of a differential scanning calorimetry (DSC) thermogram obtained by subsequently heating the polyamide copolymer from 25° C. to the molten state at 20° C. per minute.

In some embodiments, the FDCA copolymers can include 35 weight % to 95 weight % alkylene adipamide units, preferably 45 weight % to 95 weight % alkylene adipamide units, and most preferably 55 weight % to 95 weight % alkylene adipamide units, based on the total number of repeating units in the copolymer.

In some embodiments, the FDCA copolymers can include 35 weight % to 95 weight % alkylene terephthalamide units, preferably 40 weight % to 80 weight % alkylene terephthalamide units, and most preferably 50 weight % to 70 weight % alkylene terephthalamide units, based on the total number of repeating units in the copolymer.

In some embodiments, certain FDCA copolymers (e.g., terpolymers) can include 50 weight % to 10 weight % alkylene adipamide units and 20 weight % to 70 weight % alkylene terephthalamide units; preferably 40 weight % to 10 weight % alkylene adipamide units and 30 weight % to 70 weight % alkylene terephthalamide units; and most preferably 30 weight % to 10 weight % alkylene adipamide units and 40 weight % to 70 weight % alkylene terephthalamide units, based on the total number of repeating units in the copolymer.

In another aspect, the present disclosure provides a method of fabricating an article that includes: providing a polyamide copolymer as disclosed herein; and melt processing the polyamide copolymer under conditions effective to form the article. In certain embodiments, conditions effective can include one or more of injection molding, compression molding, transfer molding, and extrusion.

In another aspect, the present disclosure provides a method of preparing a polyamide copolymer. In one embodiment, the method includes providing a copolyamide prepolymer including alkylene 2,5-furan dicarboxamide repeat units, with the proviso that the copolyamide prepolymer does not include —(CH$_2$)$_{10}$— alkylene units; and heating the copolyamide prepolymer under conditions effective to form the polyamide copolymer. In certain embodiments, the copolyamide prepolymer can further include alkylene terephthalamide repeat units and/or alkylene adipamide repeat units.

In another embodiment, the method of preparing the polyamide copolymer includes: providing a copolyamide prepolymer including alkylene 2,5-furan dicarboxamide repeat units and alkylene adipamide repeat units; and heating the copolyamide prepolymer under conditions effective to form the polyamide copolymer. Optionally, the copolyamide prepolymer can further include alkylene terephthalamide repeat units.

Optionally, solid state polymerization (SSP) can be used prepare the polymer directly from the prepolymer, or alternatively, to further increase the molecular weight of the polymer resulting after melt polymerization. Solid state polymerization can be useful, for example, for enhancing the mechanical properties of polymers before injection molding or extruding. Solid state polymerization is a process in which the polymer chain lengths are increased by heat, typically in the absence of oxygen and water, by means of either vacuum or purging with an inert gas, to drive off the byproducts of reactions (e.g., reactions of active end groups within the solid polymer).

For certain applications, a polyamide copolymer as disclosed herein can be blended with another polymer (e.g., the same or different than the polyamide copolymers disclosed herein) to provide the desired physical and/or chemical properties. For example, two polyamide copolymers having different molecular weights can be blended to optimize desired physical properties. For another example, two polyamide copolymers having different repeat units can be blended to provide desired physical and/or chemical properties. For even another example, a polyamide copolymer can be blended with another polymer that is not a polyamide copolymer to provide desired physical and/or chemical properties.

Polyamide copolymers as disclosed herein can be used in combination with other materials to form a composite (e.g., a polymer having an additive therein). In addition to one or more polyamide copolymers, composites can include a wide variety of additives, and particularly particulate additives, such as, for example, fillers (e.g., including extending or reinforcing filler particles, fibers, and/or platelet materials), other polymers (e.g., polymer particulate materials such as polytetrafluoroethylene), and combinations thereof. Additives can be dissolved, suspended, and/or dispersed within the composite. For particulate additives, the additive is typically dispersed within the composite.

Additives that can be combined with a polyamide copolymer as disclosed herein to form a composition include, but are not limited to, antioxidants, UV absorbers, flame retardants, biocides, and combinations thereof.

The present invention is illustrated by the following examples. It is to be understood that the particular examples, materials, amounts, and procedures are to be interpreted broadly in accordance with the scope and spirit of the invention as set forth herein.

EXAMPLES

Listed below are the starting materials used to produce the examples:

| Compound | Supplier |
| --- | --- |
| Terephthalic acid (TA) | Aldrich |
| 1,9-nonane diamine (NDA) | Alfa Aesar |
| 1,6-hexamethylene diamine (HMDA) | Aldrich |
| Fructose | Alfa Aesar |
| Adipic Acid (AA) | Aldrich |
| Isopropanol | BDH |
| Acetone | BDH |
| Glucose | Alfa Aesar |
| Lithium bromide (LiBr) | Alfa Aesar |
| N,N-Dimethylacetamide (DMA) | Aldrich |
| Chromium (III) chloride (CrCl$_3$) | Aldrich |

Hydroxymethylfurfural (HMF) was synthesized as follows: Glucose (1.0 g, 5.55 mmol) and LiBr (1.0 g) were mixed in DMA (10 mL). Following the addition of CrCl$_3$ (53 mg, 0.333 mmol), the reaction mixture was stirred at 100° C. for 5 hours. After 5 hours, the reaction mixture was cooled and filtered over pad of celite and washed with ethyl acetate (50 mL). The filtrate was concentrated under vacuum and the residue was purified by silica gel column chromatography (using hexane/ethyl acetate as eluent) to afford HMF as a yellow oil that solidified on refrigeration. Yield: 68% $^1$H NMR (400 MHz, CDCl$_3$) δ 1.61 (bs, 1H), 4.71 (s, 2H), 6.51 (d, J=4.0 Hz, 1H), 7.19 (d, J=4.0 Hz, 1H), 9.59 (s, 1H). $^{13}$C NMR (100 MHz, CDCl$_3$) δ 57.9, 110.2, 122.8, 152.6, 160.6, 177.9.

2,5-furan dicarboxylic acid (FDCA) was synthesized as follows: To a solution prepared by dissolving sodium hydroxide (9.58 g, 0.023 mol) in water (100 g), then adding HMF (1.26 g, 10 mmol), crystals of potassium permanganate (3.63 g, 23 mmol) were added under stirring, and the stirring was continued for 24 hours at room temperature. A precipitate of manganese oxide was filtered off, and concentrated hydrochloric acid was added to the filtrate so as to bring the pH to 1 or less, thereby precipitating FDCA. The precipitate was separated by filtration, washed with water, and dried to produce FDCA (1.32 g, 8.5 mmol). The isolation yield was 85%.

The monomer salt of FDCA and NDA was prepared as follows: 5 g of FDCA (32 mmol) was taken in a 500 mL round bottom flask with 50 mL of isopropanol, then heated to reflux. The solid was partially dissolved. Then, NDA (5.53 g, 35 mmol) was dissolved in 25 mL of hot isopropanol and added dropwise to the FDCA solution. To this resulting mixture, water was added dropwise to dissolve all solid materials (30 mL) and the solution was refluxed for one hour. The solution was cooled to room temperature and solvents were removed using a rotary evaporator. The light yellow solid was washed with hot isopropanol (3×20 mL) and then with hot acetone (3×20 mL). The salt was pure enough to proceed for the next step. Yield: 9.4 g (89%. $^1$H NMR (400 MHz, CD$_3$OD) δ 6.89 (s, 2H), 2.90 (t, 7.6 Hz, 4H), 1.65-1.58 (m, 4H), 1.36-1.26 (m, 10H).

The monomer salt of TA and NDA was prepared as follows: TA (24.9 g, 0.15 mole) was taken in a 1 L round bottom flask with 200 ml of isopropanol, then heated to reflux. The solids were partially dissolved. NDA (23.7 g, 0.15 mol) was dissolved in 75 ml of hot isopropanol and added to the reaction mixture. To this resulting mixture, water was slowly added (approximately 100 ml) to dissolve all solid materials and the solution was refluxed for one hour.

A white crystalline solid precipitated out from the solution after cooling to room temperature. The solid was filtered and dried under vacuum. Yield: 46.9 g (97%). $^1$H NMR (400 MHz, CD$_3$OD) δ 7.74 (s, 4H), 2.78 (t, 8 Hz, 4H), 1.49-1.42 (m, 4H), 1.14-1.03 (m, 10H).

The monomer salt of AA and NDA was prepared as follows: NDA (23.70 g, 0.15 mole) was dissolved in 75 ml of hot isopropanol and AA (21.90 g, 0.15 mole) was dissolved in 150 ml of hot isopropanol, separately. The two hot solutions were mixed and then refluxed for one hour. A white solid precipitated out from the solution immediately after mixing. The solution was filtered hot, washed with hot isopropanol (3×15 ml), and dried under vacuum. Yield: 43.2 g (95%). $^1$H NMR (400 MHz, CD$_3$OD) δ 2.86 (t, 8 Hz, 4H), 2.18-2.14 (m, 4H), 1.64-1.58 (m, 8H), 1.4-1.32 (m, 10H).

The monomer salt of FDCA and HMDA was prepared as follows: FDCA (11.2 g, 71.7 mmol) was taken in a 500 mL round bottom flask with 100 mL of isopropanol and heated to reflux. The solid was partially dissolved. Then, HMDA (8.7 g, 75 mmol) was dissolved in 50 mL of hot isopropanol and added dropwise to the FDCA solution. To this resulting mixture, water was added dropwise to dissolve all solid materials (50 mL) and the solution was refluxed for one hour. The solution was cooled to room temperature and solvents were removed using a rotary evaporator. The light yellow solid was washed with hot isopropanol (3×20 mL) and then with hot acetone (3×20 mL). Yield: 19.0 g (97%. $^1$H NMR (400 MHz, D$_2$O) δ 6.86 (s, 2H), 2.80 (t, 8 Hz, 4H), 1.49-1.48 (m, 4H), 1.20-1.14 (m, 4H).

The monomer salt of TA and HMDA was prepared as follows: TA (33.2 g, 0.2 mole) was taken in a 1 L round bottom flask with 250 ml of isopropanol, then heated to reflux. The solids were partially dissolved. Then, HMDA (23.2 g, 0.2 mol) was dissolved in 100 ml of hot isopropanol and added to the reaction mixture. To this resulting solution, water was added slowly (approximately 200 ml) to dissolve all solid materials and the solution refluxed for one hour. A while crystalline solid precipitated out from the solution after cooling to room temperature. The solid was filtered and dried under vacuum. Yield: 53.1 g (94%). $^1$H NMR (400 MHz, CD$_3$OD) δ 7.91 (s, 4H), 2.83 (t, 8 Hz, 4H), 1.60-1.55 (m, 4H), 1.35-1.30 (m, 4H).

The monomer salt of AA and HMDA was prepared as follows: AA (50.0 g, 0.342 moles), HMDA (39.7 g, 0.342 moles), 450 ml of isopropanol, and 100 mL deionized water were charged to a single-neck, one-liter, round-bottom flask containing a stirring magnet. The stirring mixture was heated with a 96° C. oil bath until all solids were dissolved. The solution was then slowly cooled to ambient temperature, which caused crystallization of HMDA adipate as translucent, colorless crystals. The crystals were collected by vacuum filtration, washed with isopropanol, and dried under vacuum. Yield: 84.5 g (94%). $^1$H NMR (400 MHz, CD$_3$OD) δ 2.87 (t, 8 Hz, 4H), 2.18-2.15 (m, 4H), 1.65-1.60 (m, 8H), 1.43-1.40 (m, 4H).

The homopolymer of FDCA and NDA (i.e. poly(1,9-nonamethylene-2,5-furandiamide)) was synthesized as follows: FDCA/NDA salt (5 g) was dissolved in a minimum volume (15 mL) of hot degassed water. The aqueous monomer solution was then transferred to a stainless steel pressure vessel, degassed five times using vacuum, and sealed while being held under vacuum. The reaction mixture was then heated under magnetic stirring to 200° C. The reaction mixture took around one hour to reach 200° C. and the final pressure was around 250 psi. After reaching 200° C., the mixture was held for two hours. After two hours of heating, the pressure was released, the water was removed under vacuum, and heating was continued for an additional 1.5 hours. The metal reactor was cooled to room temperature, and the waxy, brittle prepolymer was removed from the reactor and crushed into small pieces with a hammer. The prepolymer was transferred to a glass tube. The tube containing the prepolymer was equipped with an overhead stirrer and nitrogen inlet and outlet. The test tube assembly was placed in an oil bath preheated to the polymerization temperature of 250° C. and vacuum was placed on the mixture. The tube was heated at 250° C. for 1.5 hours. After completion of the melt polymerization period, the heat was removed, stirring was stopped, and the reactor was allowed to cool to room temperature under vacuum. To collect the polymer, the test tube was sacrificed.

A procedure for preparing copolymers utilizing a mixture of FDCA/NDA and TA/NDA monomer salts is as follows: An FDCA/NDA and TA/NDA salt mixture (5 to 10 g, Table 1) was dissolved in a minimum amount of hot degassed water (approximately 3 times with respect to salt weight). The aqueous monomer solution was then transferred to a stainless steel pressure vessel, degassed five times using vacuum, and sealed while being held under vacuum. The reaction mixture was then heated under magnetic stirring to 220° C. The reaction mixture took around one hour to reach 220° C. and the final pressure was around 350 psi. After reaching 220° C., the mixture was held for two hours. After two hours of heating, the pressure was released, the water was removed under vacuum, and heating was continued for an additional 1.5 hours. The metal reactor was cooled to room temperature, and the waxy, brittle prepolymer was removed from the reactor. Copolymerization was achieved in a glass tube. The tube containing the prepolymer powder (3 to 10 g) was equipped with an overhead stirrer and nitrogen inlet and outlet. The test tube assembly was placed in an oil bath preheated to the polymerization temperature and vacuum was placed on the mixture. Once the powders were melted, stirring was started and polymerization was allowed to occur over a specified period of time. After completion of the melt polymerization period, the heat was removed, stirring was stopped, and the reactor was allowed to cool to room temperature under vacuum. To collect the polymer, the test tube was sacrificed.

TABLE 1

Information for the synthesis of copolyamides utilizing FDCA/NDA and TA/NDA salts.

| Sample ID | Wt. FDCA/NDA salt (g) | Wt. TA/NDA salt (g) | Melt polymerization temperature (° C.) |
| --- | --- | --- | --- |
| 100% FDCA/NDA | 5.0 | 0 | 250 |
| 70% FDCA/NDA-co-30% TA/NDA | 5.0 | 2.21 | 260 |
| 60% FDCA/NDA-co-40% TA/NDA | 9.0 | 6.19 | 260 |
| 50% FDCA/NDA-co-50% TA/NDA | 6.29 | 6.49 | 290 |
| 40% FDCA/NDA-co-60% TA/NDA | 6 | 9.29 | 300 |

A procedure for preparing copolymers utilizing a mixture of FDCA/NDA and AA/NDA monomer salts is as follows: An FDCA/NDA and AA/NDA salt mixture (5 to 15 g, Table 2) was dissolved in minimum amount of hot degassed water (approximately 3 times with respect to salt weight). The aqueous monomer solution was then transferred to a stainless steel pressure vessel, degassed five times using vacuum, and sealed while being held under vacuum. The reaction mixture was then heated under magnetic stirring to 220° C. The reaction mixture took around one hour to reach 220° C. and the final pressure was around 350 psi. After reaching 220° C., the mixture was held for two hours. After two hours of heating, the pressure was released, the water was removed under vacuum, and heating was continued for an additional 1.5 hours. The metal reactor was cooled to room temperature, and the waxy, brittle prepolymer was removed from the reactor. Copolymerization was achieved in a glass tube. The tube containing the prepolymer powder (3 to 10 g) was equipped with an overhead stirrer and nitrogen inlet and outlet. The test tube assembly was placed in an oil bath preheated to the polymerization temperature and vacuum was placed on the mixture. Once the powders were melted, stirring was started and polymerization was allowed to occur over a specified period of time. After completion of the melt polymerization period, the heat was removed, stirring stopped, and the reactor was allowed to cool to room temperature under vacuum. To collect the polymer, the test tube was sacrificed.

TABLE 2

Information for the synthesis of copolyamides utilizing FDCA/NDA and AA/NDA salts.

| Sample ID | Wt. FDCA/NDA salt (g) | Wt. AA/NDA salt (g) | Melt polymerization temperature (° C.) |
|---|---|---|---|
| 100% AA/NDA | 0 | 14 | 260 |
| 70% FDCA/NDA-co-30% AA/NDA | 6 | 2.49 | 230 |
| 60% FDCA/NDA-co-40% AA/NDA | 5 | 3.23 | 230 |
| 50% FDCA/NDA-co-50% AA/NDA | 3.04 | 3.14 | 230 |
| 40% FDCA/NDA-co-60% AA/NDA | 3.44 | 5 | 250 |
| 30% FDCA/NDA-co-70% AA/NDA | 3 | 6.78 | 250 |

A procedure for preparing copolymers utilizing a mixture of FDCA/HMDA and AA/HMDA monomer salts is as follows: An FDCA/HMDA and AA/HMDA salt mixture (5 to 10 g, Table 3) was dissolved in minimum amount of hot degassed water (approximately 3 times with respect to salt weight). The aqueous monomer solution was then transferred to a stainless steel pressure vessel, degassed five times using vacuum, and sealed while being held under vacuum. The reaction mixture was then heated under magnetic stirring to 220° C. The reaction mixture took around one hour to reach 220° C. and the final pressure was around 350 psi. After reaching 220° C., the mixture was held for two hours. After two hours of heating, the pressure was released, the water was removed under vacuum, and heating was continued for an additional 1.5 hours. The metal reactor was cooled to room temperature, and the waxy, brittle prepolymer was removed from the reactor. Copolymerization was achieved in a glass tube. The tube containing the prepolymer powder (3 to 10 g) was equipped with an overhead stirrer and nitrogen inlet and outlet. The test tube assembly was placed in an oil bath preheated to the polymerization temperature and vacuum placed on the mixture. Once the powders were melted, stirring was started and polymerization was allowed to occur over a specified period of time. After completion of the melt polymerization period, the heat was removed, stirring was stopped, and the reactor was allowed to cool to room temperature under vacuum. To collect the polymer, the test tube was sacrificed.

TABLE 3

Information for the synthesis of copolyamides utilizing FDCA/HMDA and AA/HMDA salts.

| Sample ID | Wt. FDCA/HMDA salt (g) | Wt. AA/HMDA salt (g) | Melt polymerization temperature (° C.) |
|---|---|---|---|
| 100% AA/HMDA | 0 | 25 | 275 |
| 100% FDCA/HMDA | 5 | 0 | 250 |
| 60% FDCA/HMDA-co-40% AA/HMDA | 4 | 2.56 | 250 |
| 40% FDCA/HMDA-co-60% AA/HMDA | 3 | 4.33 | 250 |

A procedure for preparing terpolymers utilizing a mixture of FDCA/NDA, AA/NDA, and TA/NDA monomer salts is as follows: An FDCA/NDA, AA/NDA, and TA/NDA salt mixture (5 to 10 g, Table 4) was dissolved in minimum amount of hot degassed water (approximately 3 times with respect to salt weight). The aqueous monomer solution was then transferred to a stainless steel pressure vessel, degassed five times using vacuum, and sealed while being held under vacuum. The reaction mixture was then heated under magnetic stirring to 220° C. The reaction mixture took around one hour to reach 220° C. and the final pressure was around 350 psi. After reaching 220° C., the mixture was held for two hours. After two hours of heating, the pressure was released, the water was removed under vacuum, and heating was continued for an additional 1.5 hours. The metal reactor was cooled to room temperature, and the waxy, brittle prepolymer was removed from the reactor. Copolymerization was achieved in a glass tube. The tube containing the prepolymer powder (3 to 10 g) was equipped with an overhead stirrer and nitrogen inlet and outlet. The test tube assembly was placed in an oil bath preheated to the polymerization temperature and vacuum was placed on the mixture. Once the powders were melted, stirring was started and polymerization was allowed to occur over a specified period of time. After completion of the melt polymerization period, the heat was removed, stirring was stopped, and the reactor was allowed to cool to room temperature under vacuum. To collect the polymer, the test tube was sacrificed.

TABLE 4

Information for the synthesis of polyamide terpolymers utilizing FDCA/NDA, AA/NDA, and TA/NDA salts.

| Sample ID | Wt. FDCA/NDA salt (g) | Wt. AA/NDA salt (g) | Wt. TA/NDA salt (g) | Melt polym. Temp. (° C.) |
|---|---|---|---|---|
| 40% FDCA/NDA-co-30% AA/NDA-co-30% TA/NDA | 2.2 | 1.71 | 1.60 | 275 |
| 30% FDCA/NDA-co-30% AA/NDA-co-40% TA/NDA | 2 | 1.94 | 2.75 | 275 |
| 20% FDCA/NDA-co-30% AA/NDA-co-50% TA/NDA | 1.5 | 2.18 | 4.87 | 275 |

A procedure for preparing terpolymers utilizing a mixture of FDCA/HMDA, AA/HMDA, and TA/HMDA monomer salts is as follows: An FDCA/HMDA, AA/HMDA, and TA/HMDA salt mixture (5 to 10 g, Table 5) was dissolved in minimum amount of hot degassed water (approximately 3 times with respect to salt weight). The aqueous monomer solution was then transferred to a stainless steel pressure vessel, degassed five times using vacuum, and sealed while being held under vacuum. The reaction mixture was then heated under magnetic stirring to 220° C. The reaction mixture took around one hour to reach 220° C. and the final pressure was around 350 psi. After reaching 220° C., the mixture was held for two hours. After two hours of heating, the pressure was released, the water was removed under vacuum, and heating was continued for an additional 1.5 hours. The metal reactor was cooled to room temperature, and the waxy, brittle prepolymer was removed from the reactor. Copolymerization was achieved in a glass tube. The tube containing the prepolymer powder (3 to 10 g) was equipped with an overhead stirrer and nitrogen inlet and outlet. The test tube assembly was placed in an oil bath preheated to the polymerization temperature and vacuum placed on the mixture. Once the powders were melted, stirring was started and polymerization was allowed to occur over a specified period of time. After completion of the melt polymerization period, the heat was removed, stirring was stopped, and the reactor was allowed to cool to room temperature under vacuum. To collect the polymer, the test tube was sacrificed.

TABLE 5

Information for the synthesis of copolyamides utilizing FDCA/HMDA, AA/HMDA, and TA/HMDA salts.

| Sample ID | Wt. FDCA/HMDA salt (g) | Wt. AA/HMDA salt (g) | Wt. TA/HMDA salt (g) | Melt polym. Temp. (° C.) |
|---|---|---|---|---|
| 50% FDCA/HMDA-co-40% AA/HMDA-co-10% TA/HMDA | 3 | 2.31 | 0.62 | 250 |
| 40% FDCA/HMDA-co-40% AA/HMDA-co-20% TA/HMDA | 2.5 | 2.41 | 1.29 | 250 |
| 30% FDCA/HMDA-co-30% AA/HMDA-co-40% TA/HMDA | 2 | 1.93 | 2.76 | 275 |
| 50% FDCA/HMDA-co-10% AA/HMDA-co-40% TA/HMDA | 2.17 | 0.42 | 1.8 | 275 |
| 40% FDCA/HMDA-co-20% AA/HMDA-co-40% TA/HMDA | 2 | 0.96 | 2.074 | 300 |

The thermal properties of the polymers produced were characterized using differential scanning calorimetry (DSC). The instrument utilized was a TA Q1000 DSC. The experiments were conducted under a $N_2$ atmosphere, and the instrument was calibrated with an indium standard. Sample sizes ranged from 4.5-7.5 mg, and samples were dried overnight in a vacuum oven at 100° C. before conducting measurements. For the measurement of glass transition temperature ($T_g$), samples were first heated from room temperature to 300° C. at a rate of 20° C./minute, then cooled to 25° C. at a rate of 200° C./minute, and finally reheated at 20° C./minute. $T_g$ was determined from the final heating ramp. For the measurement of crystallization temperature ($T_c$) and melting temperature ($T_m$), DSC thermograms were obtained by cooling polymer samples from 300° C. to 25° C. at a rate of 20° C./minute and subsequently heating the samples from 25° C. to the molten state at a rate of 20° C./minute. The crystallization temperature ($T_c$) was taken as the maximum of the crystallization exotherm upon cooling from the melt, while the melting temperature ($T_m$) was taken as the temperature maximum of the melting endotherm upon heating.

$T_g$, $T_m$, and $T_c$ data obtained for the polyamides based on FDCA, TA, and NDA are listed in Table 6. In addition, the difference between $T_m$ and $T_c$ was calculated. As discussed by Khanna (Khanna, *Polym Eng Sci* 1990, 30:1615-1619), $T_m-T_c$ can be used to compare the overall rate of crystallization of different polymers. The smaller the value of $T_m-T_c$, the faster the rate of crystallization. The homopolymer utilizing the FDCA/NDA salt did not show a melting endotherm or a crystallization exotherm in the DSC isotherms. Thus, it can be concluded that this polymer crystallized very slowly and, most likely, may not be very useful for many applications that involve injection molding of objects. The introduction of 30 weight percent TA/NDA units to produce a 70% FDCA/NDA-co-30% TA/NDA copolymer increased the glass transition temperature ($T_g$) by 8° C., and no evidence of crystallization or melting was observed. Increasing the content of TA/NDA repeat units in the copolymer to 40 weight percent resulted in a copolymer (i.e. 60% FDCA/NDA-co-40% TA/NDA) that exhibited melting and crystallization of crystallites in the DSC thermograms. The large difference between $T_m$ and $T_c$ (i.e. 53° C.) indicated that crystallization rate of this copolymer was relatively slow. Increasing the TA/NDA content of the copolymer above 40 weight percent increased $T_g$ and $T_m$, and decreased $T_m-T_c$. For engineering applications, the increase in $T_g$ and $T_m$ is desirable because relatively high $T_g$ and $T_m$ are required for applications that require high heat resistance, such as automotive under-the-hood applications. In addition, the reduction in $T_m-T_c$ is desirable because it indicates relatively fast crystallization, which can be useful for reducing the cycle-time during injection molding, and for maximizing physical properties by enabling relatively high crystallinity in molded objects. No attempt was made to produce a homopolymer from TA/NDA, because it is known that the melting point of this polymer is so high that it cannot be melt processed without thermally degrading the polymer. Overall, the copolymers of FDCA/NDA and TA/NDA possessing a TA/NDA content between 50 and 60 weight percent exhibit excellent thermal properties for applications utilizing high performance engineering thermoplastics.

TABLE 6

Thermal properties for polyamides utilizing FDCA/NDA and TA/NDA salts.

| Sample ID | $T_g$ (° C.) | $T_m$ (° C.) | $T_c$ (° C.) | $T_m - T_c$ (° C.) |
|---|---|---|---|---|
| 100% FDCA/NDA | 69 | No $T_m$ | No $T_c$ | NA |
| 70% FDCA/NDA-co-30% TA/NDA | 77 | No $T_m$ | No $T_c$ | NA |
| 60% FDCA/NDA-co-40% TA/NDA | 80 | 242 | 189 | 53 |
| 50% FDCA/NDA-co-50% TA/NDA | 88 | 259 | 225 | 34 |
| 40% FDCA/NDA-co-60% TA/NDA | 96 | 282 | 269 | 13 |

Table 7 lists the thermal properties for polyamide copolymers prepared from FDCA/NDA and AA/NDA salts. Table 8 lists the thermal properties for polyamide copolymers prepared from FDCA/HMDA and AA/HMDA salts. As shown in Table 7, the homopolymer prepared from the FDCA/NDA salt did not show a melting endotherm or a crystallization exotherm in the DSC thermograms. Thus, it can be concluded that this polymer crystallized very slowly and, most likely, may not be very useful for many applications that involve injection molding of objects. The introduction of 30 weight percent AA/NDA units to produce a 70% FDCA/NDA-co-30% AA/NDA copolymer decreased $T_g$ by 24° C. and a weak melting endotherm was observed at 159° C. However, no crystallization exotherm was observed. Increasing the weight percent of AA/NDA repeat units to 40% increased $T_m$, and a crystallization exotherm was observed. In general, increasing the AA/NDA content of the copolymers increased $T_m$. Copolymers possessing an AA/NDA content of 50 weight percent or higher were found to readily crystallize as indicated by the values of $T_m-T_c$.

TABLE 7

Thermal properties for polyamides utilizing FDCA/NDA and AA/NDA salts.

| Sample ID | $T_g$ (° C.) | $T_m$ (° C.) | $T_c$ (° C.) | $T_m - T_c$ (° C.) |
|---|---|---|---|---|
| 100% FDCA/NDA | 69 | No $T_m$ | No $T_c$ | NA |
| 100% AA/NDA | 68 | 232 | 196 | 36 |
| 70% FDCA/NDA-co-30% AA/NDA | 45 | 159 | No $T_c$ | NA |
| 60% FDCA/NDA-co-40% AA/NDA | | 166 | 121 | 45 |
| 50% FDCA/NDA-co-50% AA/NDA | 49 | 177 | 143 | 34 |
| 40% FDCA/NDA-co-60% AA/NDA | | 212 | 177 | 35 |
| 30% FDCA/NDA-co-70% AA/NDA | | 216 | 179 | 37 |

As shown in Table 8, the homopolymer utilizing the FDCA/HMDA salt did not show a melting endotherm or a crystallization exotherm in the DSC isotherms. Thus, it can be concluded that this polymer crystallized very slowly and, most likely, may not be very useful for many applications that involve injection molding of objects. The introduction of 40 weight percent AA/HMDA units to produce a 60% FDCA/HMDA-co-40% AA/HMDA copolymer resulted in the observation of melting and crystallization in the DSC thermograms. Increasing the AA/HMDA content to 60% to produce the 40% FDCA/HMDA-co-60% AA/HMDA copolymer resulted in an increase in $T_m$ and a reduction in $T_m-T_c$. The reduction in $T_m-T_c$ indicates faster crystallization and enhanced crystallizability, which is desirable for injection molding compositions. It is surprising that, based on values of $T_m-T_c$, the 40% FDCA/HMDA-co-60% AA/HMDA copolymer crystallized at a similar rate to that of the 100% AA/HMDA homopolymer, and much faster than that for the 100% FDCA/HMDA homopolymer. Typically, crystallizable homopolymers crystallize faster than their corresponding copolymers, because the homopolymers have a uniform chemical composition along the polymer backbone, which can facilitate packing of chain segments into crystals. In contrast, copolymers have two different repeat units that typically do not pack into the same crystal unit cell.

TABLE 8

Thermal properties for polyamide copolymers utilizing FDCA/HMDA and TA/HMDA salts.

| Sample ID | $T_m$ (° C.) | $T_c$ (° C.) | $T_m - T_c$ (° C.) |
|---|---|---|---|
| 100% FDCA/HMDA | No $T_m$ | No $T_c$ | NA |
| 100% AA/HMDA | 261 | 228 | 33 |
| 60% FDCA/HMDA-co-40% AA/HMDA | 188 | 140 | 48 |
| 40% FDCA/HMDA-co-60% AA/HMDA | 216 | 183 | 33 |

Table 9 lists the thermal properties for polyamide terpolymers prepared from FDCA/NDA, AA/NDA, and TA/NDA salts. Table 10 lists the thermal properties for polyamide terpolymers prepared from FDCA/HMDA, AA/HMDA, and TA/HMDA. While it is surprising that the copolymers (i.e. polymers with two different repeat units) described in Tables 9 and 10 readily crystallized, it is even more surprising that the terpolymers (i.e. polymers with three different repeat units) readily crystallized. Typically, copolymerization results in relatively slow crystallization because the chemical composition of the polymer backbone is inhomogeneous, which typically inhibits chain packing. It is very unusual that a polymer possessing three different repeat units would readily crystallize, because it is unlikely that all three repeat units would fit into the same crystalline lattice.

TABLE 9

Thermal properties for polyamide terpolymers utilizing FDCA/NDA, AA/NDA, and TA/NDA salts.

| Sample ID | $T_g$ (° C.) | $T_m$ (° C.) | $T_c$ (° C.) | $T_m - T_c$ (° C.) |
|---|---|---|---|---|
| 100% FDCA/NDA | | No $T_m$ | No $T_c$ | NA |
| 100% AA/NDA | 68 | 232 | 196 | 36 |
| 50% FDCA/NDA-co-50% AA/NDA | 49 | 177 | 143 | 34 |
| 50% FDCA/NDA-co-50% TA/NDA | 88 | 259 | 225 | 34 |
| 40% FDCA/NDA-co-30% AA/NDA-co-30% TA/NDA | | 226 | 188 | 38 |
| 30% FDCA/NDA-co-30% AA/NDA-co-40% TA/NDA | | 240 | 208 | 32 |
| 20% FDCA/NDA-co-30% AA/NDA-co-50% TA/NDA | | 259 | 233 | 26 |

TABLE 10

Thermal properties for polyamide terpolymers
utilizing FDCA/HMDA, AA/HMDA, and TA/HMDA.

| Sample ID | $T_m$ (° C.) | $T_c$ (° C.) | $T_m - T_c$ (° C.) |
|---|---|---|---|
| 100% FDCA/HMDA | No $T_m$ | No $T_c$ | NA |
| 100% AA/HMDA | 261 | 228 | 33 |
| 60% FDCA/HMDA-co-40% AA/HMDA | 196 | 151 | 45 |
| 40% FDCA/HMDA-co-60% AA/HMDA | 216 | 183 | 33 |
| 50% FDCA/HMDA-co-40% AA/HMDA-co-10% TA/HMDA | 203 | 150 | 53 |
| 40% FDCA/HMDA-co-40% AA/HMDA-co-20% TA/HMDA | 225 | 184 | 41 |
| 30% FDCA/HMDA-co-30% AA/HMDA-co-40% TA/HMDA | 259 | 230 | 29 |
| 50% FDCA/HMDA-co-10% AA/HMDA-co-40% TA/HMDA | 273 | 243 | 30 |

Overall, the thermal property data obtained for the FDCA-based copolymers of the invention indicated that many of the compositions crystallized relatively fast and possessed a high enough $T_m$ and $T_g$ to be useful for many demanding engineering applications. To access other properties beyond thermal properties, one promising composition, namely, 40% FDCA/NDA-co-60% TA/NDA, was scaled-up to approximately 15 g and test specimens were injection molded using a model 45 Mini Jector injection molder. With the test specimens produced, impact strength and moisture uptake were measured. In addition, thermal stability was measured using thermal gravimetric analysis and an air atmosphere. As a reference material, the commodity engineering thermoplastic, nylon 6,6 (100% AA/HMDA), was also synthesized, molded, and tested. Notched Izod impact was tested according to ASTM D256. Moisture uptake was measured using an Arizona Instruments Computrac 4000XL Moisture Analyzer. Molded samples were soaked in distilled water for one week and adsorbed moisture was removed by towel drying the specimens prior to analysis. Samples were heated to 210° C. and, while maintaining this temperature, mass loss was recorded. Once the mass loss slowed to 0.015% moisture/minute, the analysis was deemed complete, and the total mass loss measured was recorded as the total moisture absorbed. Table 11 lists the properties obtained for 40% FDCA/NDA-co-60% TA/NDA and 100% AA/HMDA (i.e. nylon 6,6).

As shown in Table 11, compared to nylon 6,6, the 40% FDCA/NDA-co-60% TA/NDA copolymer provided enhanced properties with respect to every property measured. All thermal properties as well as crystallization rate were higher for 40% FDCA/NDA-co-60% TA/NDA. Both the thermal stability and impact strength for 40% FDCA/NDA-co-60% TA/NDA were higher than that for nylon 6,6. In addition, the moisture uptake of 40% FDCA/NDA-co-60% TA/NDA was about an order of magnitude lower than that for nylon 6,6. The lower moisture uptake for 40% FDCA/NDA-co-60% TA/NDA may be very significant, because a relatively high moisture uptake is a major drawback for the commodity polyamides, e.g., nylon 6,6 and nylon 6. Absorption of significant levels of moisture can result in dimensional changes of molded parts, as well as a reduction in important mechanical properties such as modulus, tensile strength, and $T_g$.

TABLE 11

A comparison of properties obtained for 40% FDCA/NDA-co-60% TA/NDA and 100% AA/HMDA (i.e. nylon 6,6).

| Property | 100% AA/HMDA (i.e. nylon 6,6) | 40% FDCA/NDA-co-60% TA/NDA |
|---|---|---|
| $T_g$ (° C.) | 59 | 96 |
| $T_m$ (° C.) | 261 | 282 |
| $T_c$ (° C.) | 228 | 269 |
| $T_m - T_c$ (° C.) | 33 | 13 |
| Temperature at 5% wt. loss (° C.) | 411 | 457 |
| Temperature at 50% wt. loss (° C.) | 471 | 501 |
| Notched Izod Impact (J/m) | 41 | 54 |
| Moisture uptake (wt. %) | 4.7 | 0.40 |

The complete disclosure of all patents, patent applications, and publications, and electronically available material (e.g., GenBank amino acid and nucleotide sequence submissions; and protein data bank (pdb) submissions) cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

The invention claimed is:

1. A polyamide copolymer comprising at least one alkylene 2,5-furan dicarboxamide unit and at least one alkylene terephthalamide unit, wherein the polyamide copolymer has 35 weight % to 95 weight % alkylene terephthalamide units, with the proviso that the copolymer does not comprise —$(CH_2)_{10}$— alkylene units, wherein the polyamide copolymer has a difference between melting temperature ($T_m$) and crystallization temperature $T_c$ of at most 50° C.;

wherein the crystallization temperature ($T_c$) is taken as the maximum of the crystallization exotherm of a differential scanning calorimetry (DSC) thermogram obtained by cooling the polyamide copolymer from 300° C. to 25° C. at 20° C. per minute; and wherein the melting temperature ($T_m$) is taken as the maximum of the melting endotherm of a differential scanning calorimetry (DSC) thermogram obtained by subsequently heating the polyamide copolymer from 25° C. to the molten state at 20° C. per minute.

2. The polyamide copolymer of claim 1 wherein the at least one alkylene 2,5-furan dicarboxamide unit is of the formula:

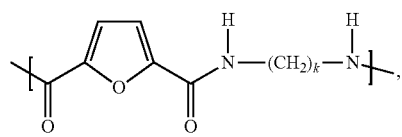

wherein k=6-9 or 11-30.

3. The polyamide copolymer of claim 1 wherein the at least one alkylene terephthalamide unit is of the formula:

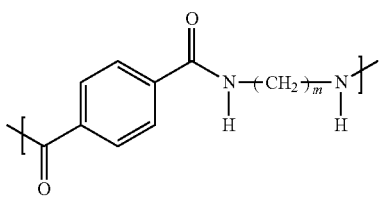

wherein m=6-9 or 11-30.

4. The polyamide copolymer claim 1, wherein the copolymer further comprises at least one alkylene adipamide unit.

5. The polyamide copolymer of claim 4 wherein the at least one alkylene adipamide unit is of the formula:

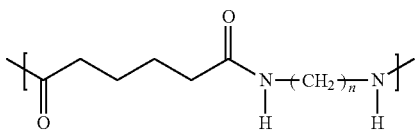

wherein n=6-9 or 11-30.

6. The polyamide copolymer of claim 1 wherein the difference between melting temperature ($T_m$) and crystallization temperature ($T_c$) is at most 40° C.

7. The polyamide copolymer of claim 1 wherein the difference between melting temperature ($T_m$) and crystallization temperature ($T_c$) is at most 30° C.

8. The polyamide copolymer of claim 1, wherein all the amide units in the copolymer include the same diamine fragment.

9. A method of fabricating an article comprising:
providing a polyamide copolymer according to claim 1; and
melt processing the polyamide copolymer under conditions effective to form the article.

10. The method of claim 9 wherein conditions effective comprise one or more of injection molding, compression molding, transfer molding, and extrusion.

11. A method of preparing a polyamide copolymer, the method comprising:
providing a copolyamide prepolymer comprising alkylene 2,5-furan dicarboxamide repeat units and alkylene terephthalamide repeat units, with the proviso that the copolyamide prepolymer does not comprise —$(CH_2)_{10}$— alkylene units; and
heating the copolyamide prepolymer under conditions effective to form the polyamide copolymer, wherein the polyamide copolymer has 35 weight % to 95 weight % alkylene terephthalamide units,
wherein the polyamide copolymer has a difference between melting temperature $T_m$ and crystallization temperature $T_c$ of at most 50° C.
wherein the crystallization temperature ($T_c$) is taken as the maximum of the crystallization exotherm of a differential scanning calorimetry (DSC) thermogram obtained by cooling the polyamide copolymer from 300° C. to 25° C. at 20° C. per minute; and
wherein the melting temperature ($T_m$) is taken as the maximum of the melting endotherm of a differential scanning calorimetry (DSC) thermogram obtained by subsequently heating the polyamide copolymer from 25° C. to the molten state at 20° C. per minute.

12. The method of claim 11 wherein the copolyamide prepolymer further comprises alkylene adipamide repeat units.

13. A method of preparing a polyamide copolymer, the method comprising:
providing a copolyamide prepolymer comprising alkylene 2,5-furan dicarboxamide repeat units and alkylene adipamide repeat units; and
heating the copolyamide prepolymer under conditions effective to form the polyamide copolymer, wherein the polyamide copolymer has 35 weight % to 95 weight % alkylene adipamide units,
wherein the polyamide copolymer has a difference between melting temperature $T_m$ and crystallization temperature ($T_c$) of at most 50° C.;
wherein the crystallization temperature ($T_c$) is taken as the maximum of the crystallization exotherm of a differential scanning calorimetry (DSC) thermogram obtained by cooling the polyamide copolymer from 300° C. to 25° C. at 20° C. per minute; and
wherein the melting temperature ($T_m$) is taken as the maximum of the melting endotherm of a differential scanning calorimetry (DSC) thermogram obtained by subsequently heating the polyamide copolymer from 25° C. to the molten state at 20° C. per minute.

14. The method of claim 13 wherein the copolyamide prepolymer further comprises alkylene terephthalamide repeat units.

* * * * *